Nov. 8, 1949          C. R. HODGES          2,487,709
APPARATUS FOR SHARPENING IMPLEMENT DISKS
Filed Jan. 20, 1948          6 Sheets-Sheet 1

Clarence R. Hodges
INVENTOR.

BY *Attorneys*

Nov. 8, 1949   C. R. HODGES   2,487,709
APPARATUS FOR SHARPENING IMPLEMENT DISKS
Filed Jan. 20, 1948   6 Sheets-Sheet 2

Clarence R. Hodges
INVENTOR.

Nov. 8, 1949  C. R. HODGES  2,487,709
APPARATUS FOR SHARPENING IMPLEMENT DISKS
Filed Jan. 20, 1948  6 Sheets-Sheet 5

Clarence R. Hodges
INVENTOR.

Nov. 8, 1949     C. R. HODGES     2,487,709
APPARATUS FOR SHARPENING IMPLEMENT DISKS
Filed Jan. 20, 1948     6 Sheets-Sheet 6

Clarence R. Hodges
INVENTOR.

Patented Nov. 8, 1949

2,487,709

UNITED STATES PATENT OFFICE 2,487,709

APPARATUS FOR SHARPENING IMPLEMENT DISKS

Clarence R. Hodges, Julesburg, Colo., assignor of fifty per cent to Henry H. Hodges, James L. Hodges, and Kenneth R. Hodges, doing business as Hodges Mfg. Co., Julesburg, Colo.

Application January 20, 1948, Serial No. 3,197

9 Claims. (Cl. 51—104)

This invention relates to apparatus for sharpening implement disks and has for its primary object to effect economies in the time and labor expended in sharpening implement disks such as are employed on harrows and like farm machinery.

Another object is to enable a group of disks supported in place on a piece of farm machinery to be sharpened without the necessity of removing them from their arbors.

A further object is to support a single disk, such as a colter disk on the machine in a position to be acted upon by the sharpening equipment.

A still further object is to place the sharpening of the disk under direct manual control of an operator.

Still another object is to rotate a disk during the grinding operations thereof and thereby assure complete sharpening of the entire periphery of the disk.

The above and other objects may be attained by employing this invention which embodies among its features a track extending parallel to a row of disks mounted for rotation about a common axis, a carriage movable along said track to a position adjacent a disk to be sharpened, a bed-frame pivotally supported at one end on the carriage to swing in a horizontal arc, a wheel supporting the opposite end of the bed-frame, and means to hold said bed-frame at various different angles with relation to the carriage.

Other features include a sub-frame mounted for longitudinal movement on the bed-frame, a grinding wheel mounted for rotation on the sub-frame adjacent the track, a friction wheel mounted on the sub-frame adjacent the grinding wheel and adapted to engage and rotate an implement disk, and means on the sub-frame for driving the grinding wheel and friction wheel in unison.

Other features include manually actuated means for advancing the grinding wheel into contact with a disk engaged by the friction wheel, and to advance or retract the sub-frame on the bed-frame.

Still other features include universally movable means supporting the friction wheel on the sub-frame and manually actuated means for controlling the movements of the universally movable means.

Still further features include a pair of friction wheels mounted on the universally movable means, means to yieldingly advance the friction wheels toward one another to cause them to engage opposite sides of the disk being operated upon and manual actuated means to separate the friction wheels against the effort of the yielding means.

Referring to the drawings in detail, this improved apparatus for sharpening implement disks comprises a bed-frame designated generally 10 which is composed of spaced parallel side bars 12 which, in the preferred form of the invention, are in the form of angle bars. These side bars are held in spaced parallel relation by cross members 14, and extending upwardly and rearwardly from one end of the frame 10 is a bracket 16 having a barrel 18, the axis of which extends vertically and rotatably supported in the barrel 18 is the shank of a fork 20 in which a caster wheel 22 is rotatably mounted. Pivotally coupled to one of the cross members 14 of the bed-frame 10 adjacent the end remote from the bracket 16, as at 24, is a carriage 26 which is of a length greater than the width of the bed-frame 10, and rotatably mounted in opposite ends of the carriage 26 are flanged wheels 28 which are adapted to run on a track 30. Mounted on the carriage adjacent opposite ends are upwardly extending studs 32 having formed intermediate their ends transversely extending openings through which arcuate guide arms 34 are adapted to slide. Suitable set screws 36 enter the upper ends of the studs 32 and their inner ends are adapted to impinge against the slides 34 to lock the frame 10 in various angular positions with relation to the carriage 26. By this simple expedient, it is possible to place the track 30 on the ground adjacent and parallel with the axis of a group of implement disks D without removing them from the implement I (Fig. 5) and grind the disks while they remain in position on the implement irrespective of the position in which they are dished.

Carried by one of the side bars 12 of the frame 10 intermediate its ends is an angle bracket 38, one leg of which extends vertically between the side bars 12 and has pivotally connected adjacent its upper end a link 40 which extends forwardly toward the track 30 and is provided adjacent its free end with a group of longitudinally spaced, downwardly opening slots 42, the purpose of which will be more fully hereinafter explained. Mounted for longitudinal movement along the side bars 12 of the bed-frame 10 is a sub-frame designated generally 44 which comprises spaced parallel side bars 46, held in spaced parallel relation at the end adjacent the carriage 26 by a transversely extending cross member 48, and at the opposite end by an angle cross member and platform 50 on which a prime mover 52 such as an internal combustion engine is mounted.

Extending upwardly intermediate the ends of the side bars 46 of the sub-frame 44 are columns 54, and extending transversely between the upper ends of the columns 54 are cross bars 56. Mounted for rotation within a longitudinally extending tube 58 which is carried by the cross bars 56 is a propeller shaft 60 which carries at one end a drive gear 62 having driving connection with a drive pinion which is mounted on the columns 54 at one side of the sub-frame 44 for rotation about an axis which lies parallel to the axis of the propeller shaft 60 and coupled to the pinion 64 is a drive pulley 65. This drive pulley 65 has driving connection with the drive pulley 66 of the prime mover 52 through the medium of an endless drive belt 67. It will thus be seen that when the prime mover is set into operation, the shaft 60 and the drive gear 62 will rotate. Mounted for rotation between pairs of the column 54 in parallel relation below the shaft 60 is one end of a telescopic shaft 68 carrying at one end a drive pinion 70 which meshes with the gear 62. The end of the telescopic shaft remote from that carrying the pinion 70 is equipped with a flexible coupling 76, the purpose of which will hereinafter appear.

Extending upwardly from a cross member 78 carried by the sub-frame 44 between the columns 54 and the cross member 48 is an upstanding flange 80, intermediate the ends of which is welded or otherwise secured an upwardly extending bracket 82. A similar bracket 84 is welded or otherwise rigidly fixed to the cross member 48 intermediate its ends, and these brackets 82 and 84 are pierced with aligning openings for the reception of a pivot bolt 86 on which the grinding wheel supporting frame, designated generally 88, is supported to rock about a horizontal axis which extends longitudinally of the bed-frame 10, and the sub-frame 44 substantially midway between opposite sides thereof.

The grinding wheel supporting frame 88 above referred to comprises a pair of end members 90 between which extend spaced parallel tubular members 92 and 94. The end members 90 are pierced with aligning openings which register with the opening in the tube 92 to receive the pivot bolt 86, so that the frame 88 may rock through a vertical arc which lies transversely of the frame 10. The end members 90 are also pierced with aligning openings which register with the tubular member 94, and supported on the end members 90 are suitable aligned bearings 96 in which the drive shaft 98 of the grinding wheel 100 is mounted to rotate. The grinding wheel 100 is mounted on the end of the shaft 98 adjacent the carriage 26, and the end of the drive shaft 98 remote from the grinding wheel is connected to the flexible coupling 76 so that the grinding wheel will be driven in unison with the telescopic shaft 68. Projecting laterally from the frame 88 adjacent the end of the tube 94 remote from the grinding wheel is a pivot pin 102 upon which is rockably supported a sleeve 104, and projecting upwardly from the sleeve 104 intermediate its ends is a control lever 106. A lever arm 108 projects downwardly from the sleeve 104 in axial alignment with the control lever 106 and extending laterally from the lever arm 108 near its lower end is a cross pin 110 which is adapted to engage in one of the notches 42 in the link 40, so that by rocking the arm 106 about the axis of the pivot 102, the sub-frame 44 and the apparatus thereon may be moved longitudinally of the bed-frame 10, and by rocking the control lever 106 transversely of the bed-frame 10, the wheel supporting frame 88 may be rocked about the axis of the pivot pin 86, to swing the grinding wheel 100 through an arc which extends transversely of the main frame 10 and the bed-frame 44.

Formed in the transverse member 48 is an elongated longitudinal slot 110 for the reception of a stem 112 formed at the lower end of a pedestal 114. This pedestal 114 is provided adjacent its lower end with a base flange 116 which is provided with an annular row of spaced openings 118 for the reception of a bolt 120 which is adapted to pass through the slot 110 and through a selected opening 118 to hold the pedestal in various adjusted positions about its vertical axis on the cross member 48. The pedestal is of tubular form and is provided adjacent its upper end with an elongated incision 122, upon opposite sides of which are laterally projecting ears 124 which are pierced with aligning openings to receive a clamping bolt 126 for a purpose to be more fully hereinafter described.

Entering the upper end of the pedestal 114 is a cylindrical shank 128 carrying at its upper end a flat head 130 which is pierced with a transversely extending opening for the reception of a clamping bolt 132 by which an angle bracket 134 is adjustably clamped to the head 130. The leg of the angle bracket 134 opposite that which engages the head 130 is pierced to receive a pivot pin 136 by which the friction wheel supporting unit, to be more fully hereinafter described, is adjustably coupled to the bracket 134.

Figures 1, 8, 13:
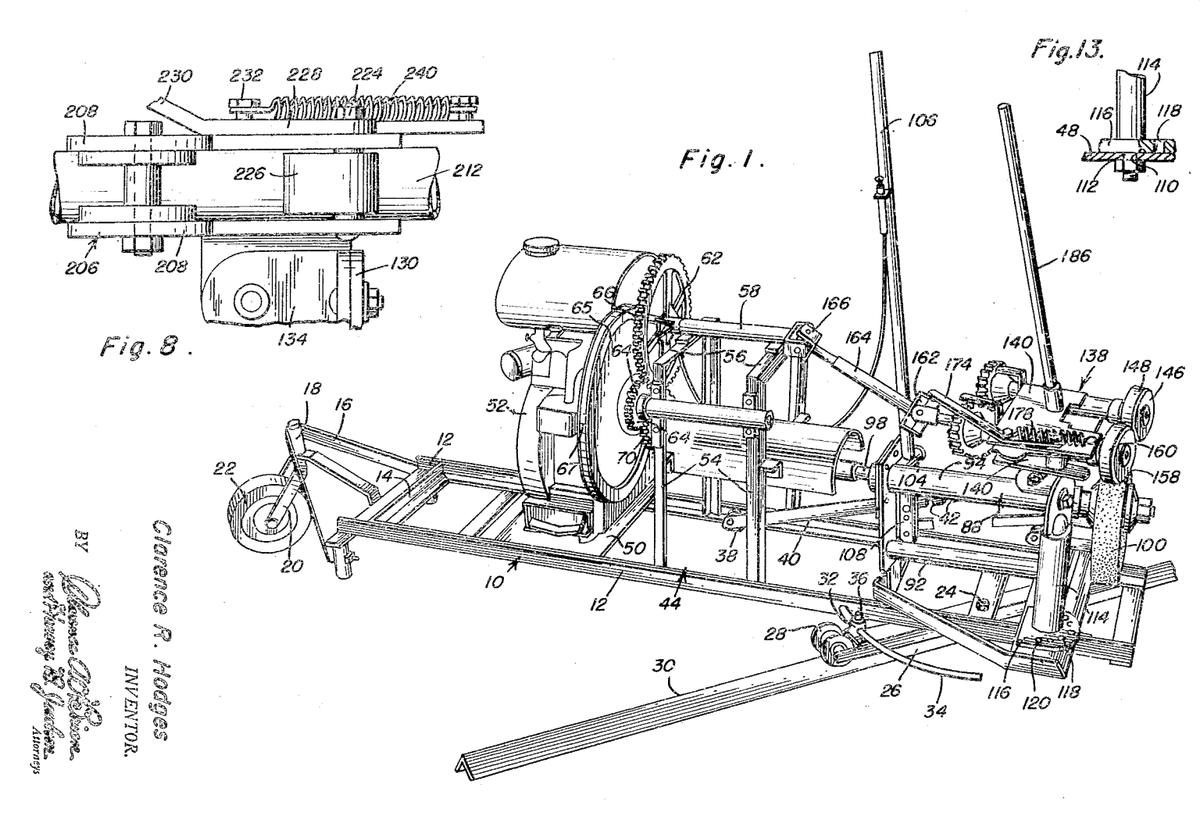
Figure 1 is a perspective view of a disk sharpening apparatus embodying the features of this invention.
Figure 8 is an enlarged fragmentary side view of the device illustrated in Figure 6.
Figure 13 is an enlarged fragmentary sectional view through the cross member showing the connection thereof to the base flange and pedestal, a portion of the base flange being shown in section.
Figures 2, 3:
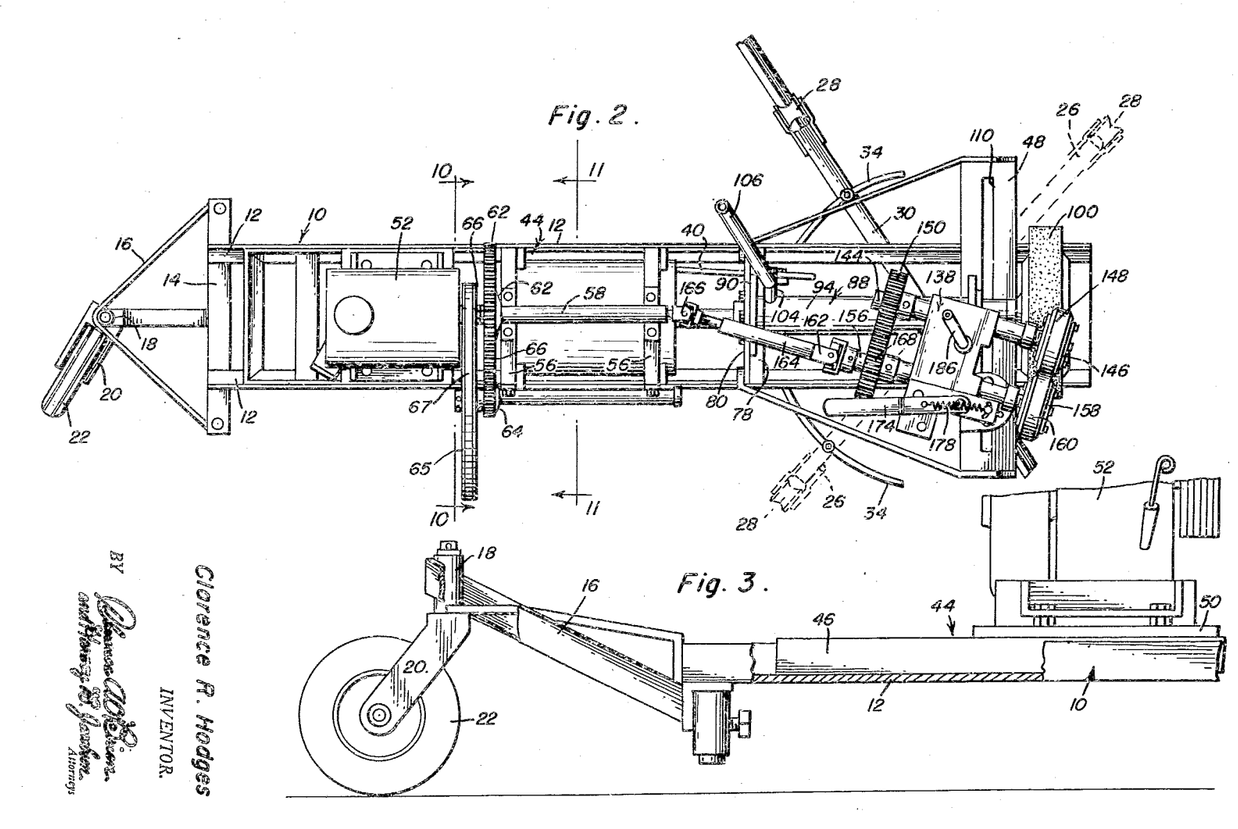
Figure 2 is a top plan view of the disk sharpening apparatus illustrated in Figure 1.
Figure 3 is an enlarged side view partially in section of the rear end of the bed-frame.
Figure 4:
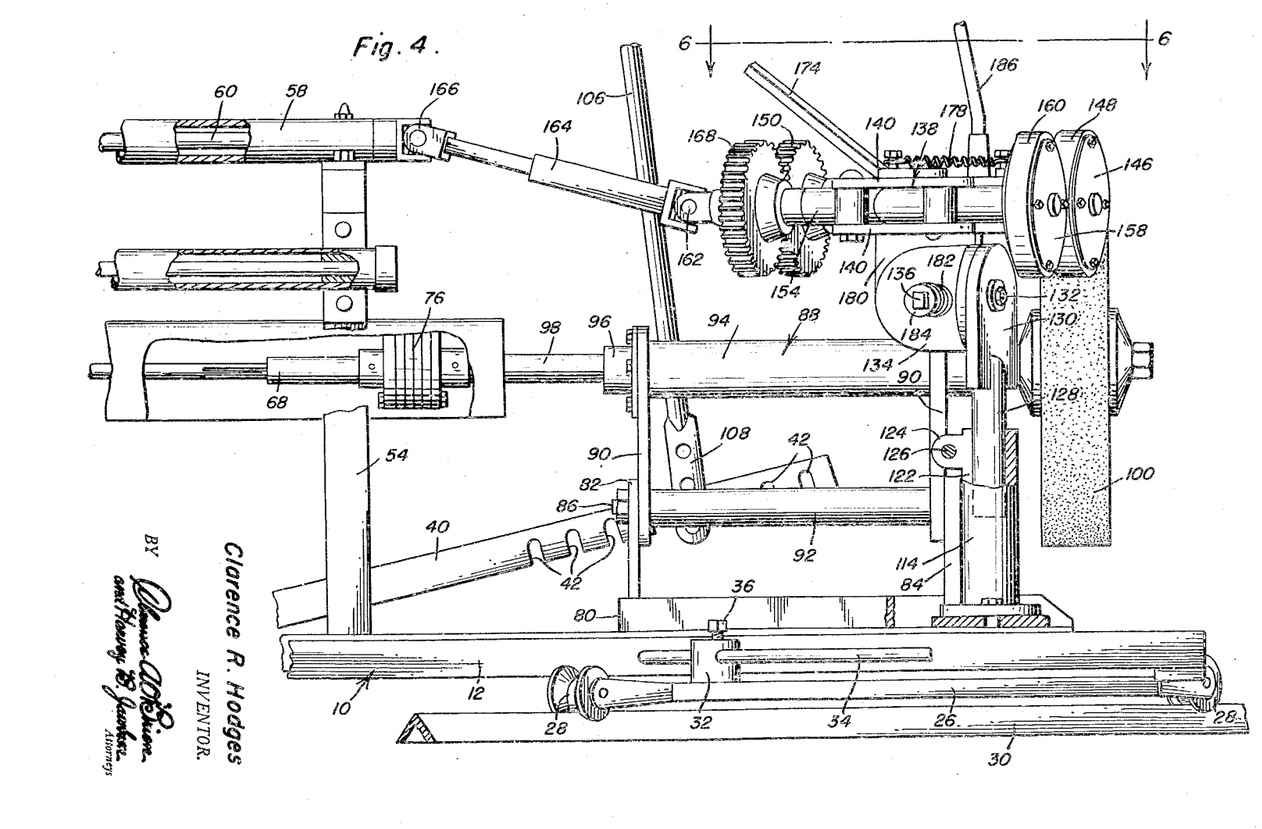
Figure 4 is a fragmentary enlarged side view of the forward end of the apparatus illustrated in Figure 1 with certain portions broken away more clearly to illustrate certain details of construction.
Figures 5, 6:
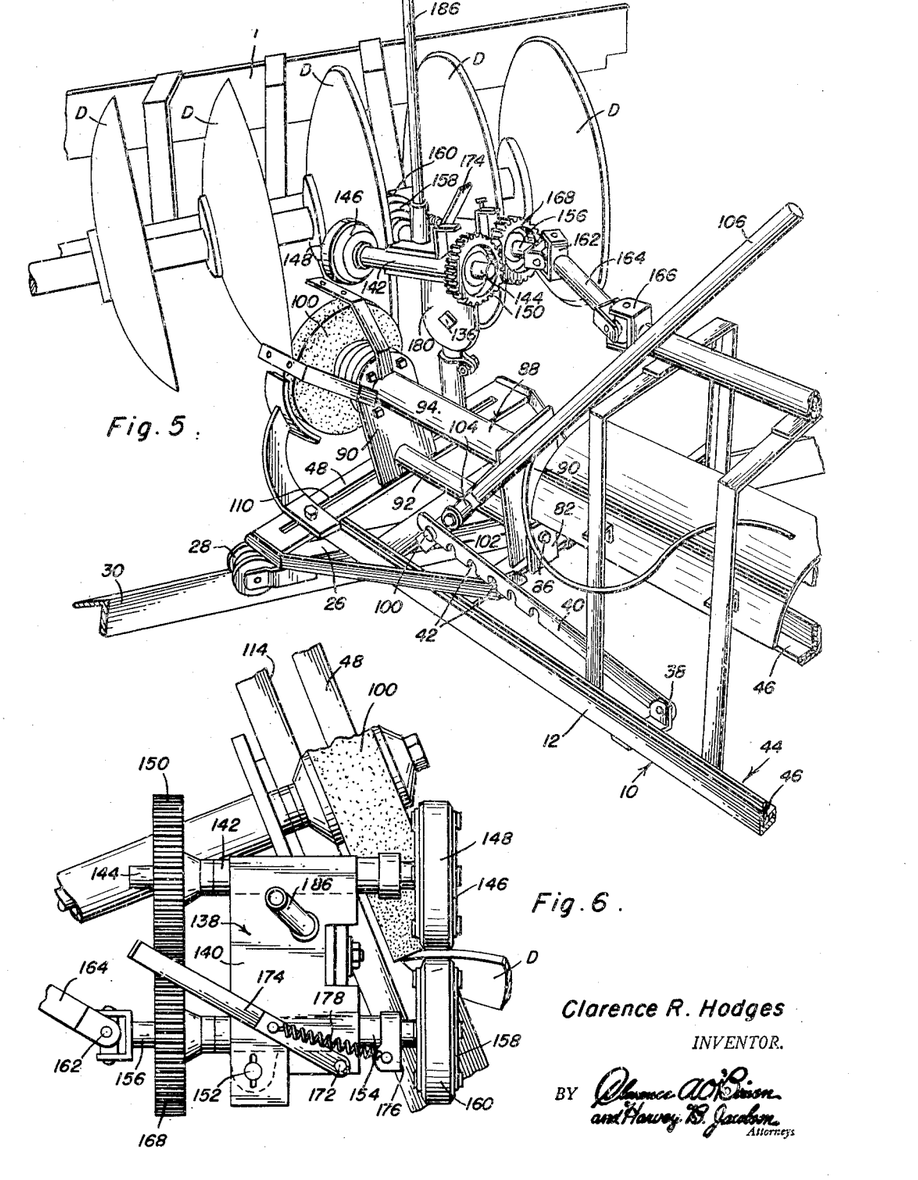
Figure 5 is an enlarged fragmentary perspective view illustrating the device in a position to operate on an implement disk mounted on an implement frame.
Figure 6 is a horizontal sectional view taken substantially along the line 6—6 of Figure 4.

The friction wheel carrying unit or head above referred to is designated generally 138 and comprises a pair of spaced parallel plates 140 between which is welded, adjacent one end of the head 38, a tubular housing 142 provided adjacent opposite ends with suitable bearings in which a shaft 144 is rotatably mounted. Opposite ends of the shaft project beyond the tube 142 and fixed to one end of the shaft is a friction drive wheel 146 carrying a peripheral band 148 of a suitable friction material such as leather, rubber, or the like. The end of the shaft 144 remote from that carrying the friction wheel 146 has fixed thereto for rotation therewith a spur gear 150 by which the shaft 144 is rotated. Pivotally and slidably mounted between the plates 140 adjacent the opposite end of the head 38, as at 152, is a tubular housing 154 which lies substantially parallel to the housing 142 and has journaled therein a drive shaft 156 carrying, adjacent one end, a friction wheel 158, the surface of which is covered with a suitable friction band 160 similar to that previously described. As illustrated in Figure 6, these wheels 146 and 158 are adapted to cooperate in driving a disk D to be sharpened. The end of the shaft 156 remote from the friction drive wheel 158 is equipped with a universal joint 162 to which one end of a telescopic drive shaft 164 is coupled. The opposite end of the telescpic drive shaft 164 is coupled through the medium of a universal joint 166 with the shaft 60 previously referred to, and mounted on the shaft 156 adjacent the universal joint 162 is a spur gear 168 which is adapted to mesh with the spur gear 150 so as to drive the friction wheels 146 and 158 in unison, but in opposite directions. The distance between the tubes 142 and 154 is such as to allow for relatively loose meshing engagement between the spur gears 150 and 168 so that the tubular housing 154 may swing about the coupling 152 and move the friction drive wheel 158 out of engagement with the disk D. In order to effect such movement and at the same time yieldingly to urge the friction surface 160 of the friction drive wheel 158 into engagement with the disk D a lever 174 is pivotally coupled at 172 (Fig. 6) to the topmost plate 140 between the pivot 152 and the wheel 158. A suitable bracket 176 is carried by the tubular housing 154 and coupled to said bracket is one end of a retractile coil spring 178, the opposite end of which is connected to the lever 174 so that as the lever is moved about the pivot 172, the spring 178 will be tensioned to move the wheel 158 toward or away from the disk D, as will be readily understood upon reference to Figure 6. Depending from the bottom plate 140 is a supporting arm 180 which is pierced to receive the pin 136, and surrounding said pin is a compression coil spring 182, one end of which engages the angle bracket 134, while the opposite end engages a washer 184 mounted on the pin 136 beneath the head thereof. It will thus be seen that the head 138 will be frictionally held in various adjusted positions on the bracket 134, and in order to move the head 138 into various positions on the bracket, a suitable control handle 186 is secured to the topmost plate 140 and extends upwardly from the head 138 for manipulation by the operator of the machine.

Figure 9:
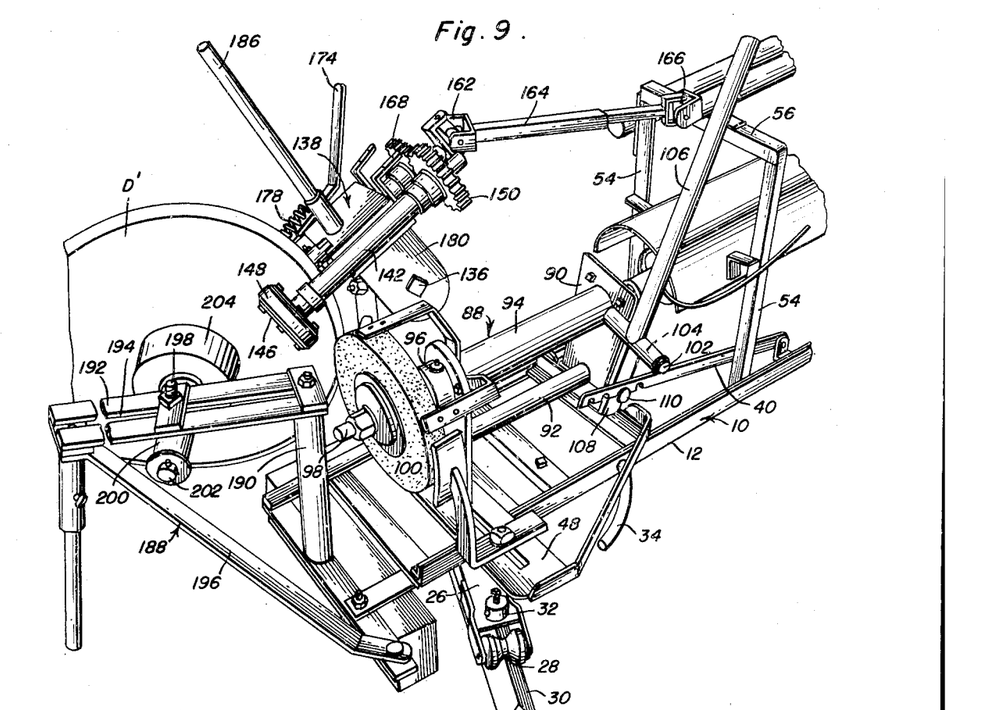
Figure 9 is a fragmentary perspective view of the machine illustrating a support for a single disk coupled to the forward end of the machine for the purpose of supporting the disk for rotation during the grinding thereof.
Figure 10:
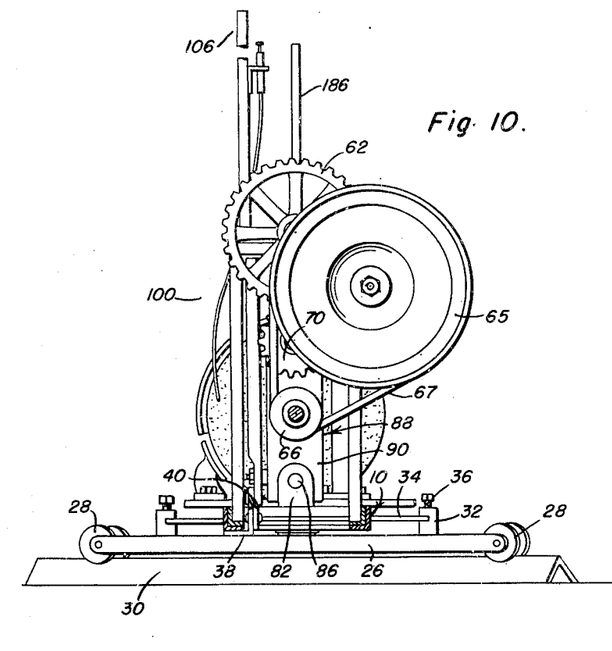
Figure 10 is a transverse sectional view taken on the line 10—10 of Figure 2.
Figure 11:
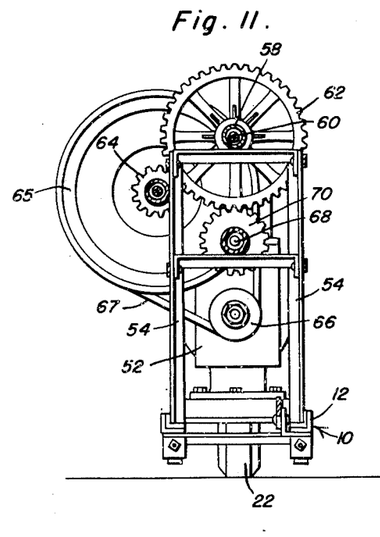
Figure 11 is a transverse sectional view taken on the line 11—11 of Figure 2.
Figure 12:
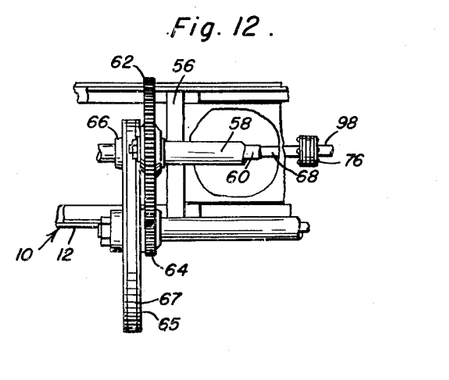
Figure 12 is a fragmentary plan view of a portion of the machine.

In Figure 9, I have illustrated an attachment for the machine by which a single implement disk D' may be supported on the machine for sharpening. This attachment is designated generally 188 and comprises a standard or column 190 which is supported on one of the cross members of the bed-frame 10 adjacent the grinding wheel 100. Extending horizontally from the upper end of the standard or column 190 in a direction away from the machine but at an angle to the longitudinal axis thereof is a horizontally extending bar 192 which is provided midway between opposite side edges with a longitudinal slot 194. The end of the bar 192 remote from the standard 190 is supported on an angle bracket 196 which, as illustrated in Figure 9, is connected to the cross member of the main bed-frame 10 to which the standard 190 is fixed. Mounted for longitudinal sliding movement in the slot 194 is a stud 198 which supports, at its lower end, a tubular bearing member 200 in which a spindle 202 is journaled. This spindle is provided adjacent one end with a suitable supporting head 204 carrying coupling means by which the disk D' may be mounted on the spindle 202 for rotation therewith about the axis thereof. By adjusting the stud 198 longitudinally of the slot 194, it is obvious that the disk D' may be brought into proper position with relation to the grinding wheel 100 and the friction wheels 146 and 158 so that the edge thereof may be ground.

Figure 7:
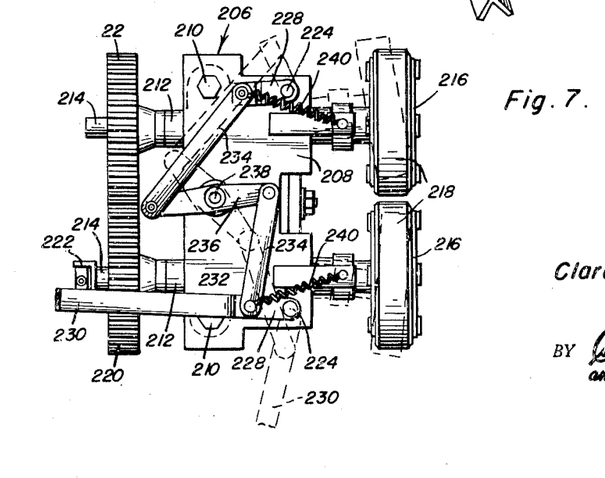
Figure 7 is a view similar to Figure 6 of a modification thereof.

In the modification illustrated in Figure 7, a head 206 may be substituted for the head 138 previously described, and, like the head 138, comprises a pair of spaced parallel plates 208 between which are pivotally supported, as at 210, tubular housings 212 in which friction wheel driving shafts 214 are mounted to rotate. Fixed to certain ends of the shafts 214 are friction driving wheels 216 provided with peripheral bands 218 of a suitable friction material, such as that previously referred to. Mounted on the shafts 214 adjacent the ends remote from the friction wheels 216 are meshing spur gears 220, and fixed to the end of one of said shafts 214 adjacent its respective gear 220 is a universal joint 222 which is adapted to be connected to the telescopic drive shaft 164 previously referred to. The bottom plate 208 of the head 206 carries a suitable supporting bracket which corresponds to the bracket 180 previously mentioned and is adapted to cooperate with the angle bracket 134 in supporting the head 206 in proper position on the machine. Pivotally mounted, as at 224, between the plates 208 for engagement with the outer sides of the tubular housings 212 are eccentrics 226, and coupled to the eccentrics 226 for rotation about their axes of rotation are levers 228, one of which is extended to form a handle 230. Pivotally connected to the levers 228 as at 232 are links 234, which, in turn, are connected to a rock arm 236 which is pivoted at 238 to swing about a fixed axis midway between the tubular housings 212. It will thus be seen that as the handle 230 is moved about its pivot 224, the levers 228 and their respective eccentrics 226 will be moved in unison. One end of a retractile coil spring 240 is coupled to the pivotal connection between each lever 228 and its respective link 234, and the opposite end of each spring 240 is fixed to an adjacent tubular housing 212 near its respective friction wheel 216 in such a manner that the tension of the springs 240, when the handle 230 is in the position illustrated in the full lines in Figure 7, will tend to advance the friction surfaces 218 of the friction wheels 216 toward one another. On the other hand, when the lever or handle 30 is moved into the dotted line position illustrated in Figure 7, it will be evident that the spring tension will tend to move the friction wheels 216 further apart.

In use, it will be understood that the track 30 is laid on the ground in spaced parallel relation with the axis of a gang of implement disks D, as the latter remain in position on the implement. The carriage 26 is then moved along the track 30 to a position before a disk D to be sharpened while the sub-frame 44 is in retracted position. When the carriage has moved the bed-frame 12 into the proper position before the disk to be sharpened, the sub-frame 44 is moved toward the disk by rocking the hand lever 106 about the axis of the pin 102, it being understood that the pin 110 has been previously engaged in a notch 42 in the link 40. The hand lever 174 is thrown to a position to spread the friction wheels 146 and 158 so that the edge of the disk D to be sharpened will pass through the space between the wheels into a position to be engaged by the grinding wheel 100. The hand lever 174 is then moved into the position illustrated in the full lines in Figure 6 so as to advance the friction wheel 158 into engagement with the disk D under the influence of the yielding pressure of the spring 178, thereby to grip the disk between the friction drive wheels 146 and 158. Upon setting the prime mover into operation, it will be evident that the friction drive wheels 146 and 158 will be driven in unison to cause the disk D to rotate about its axis, and by rocking the hand lever 106 laterally about the axis of the pivot pin 86, it will be evident that the grinding wheel will swing through an arc, under the control of the operator, which arc intersects the edge of the disk D being ground. In this way, the sharpening of the disk is entirely under the control of the user, as it is possible not only to move the grinding wheel 100 into and out of engagement with the disk D through the lateral arc, but also the sub-frame 44 may be advanced or retracted relative to the disk on the main frame 10, thus giving a universal control of the grinding wheel. Obviously, by manipulating the hand lever 186, the axes of the friction wheels 146 and 158 may be brought into a radial position with relation to the axis of rotation of the disk which is being operated upon.

A further action of the fiber drive rollers is to produce sufficient contact with the blade being sharpened to cause the sharpener to roll on the roller assembly and track and pivot wheel to the same extent as the movement of the peripheral edge of a crooked blade out of the radial plane of the blade.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. Apparatus for sharpening a row of rotatably supported implement disks which includes a track extending parallel to the row of disks, a carriage movable along said track to a position adjacent a disk to be sharpened, a bed-frame pivotally supported at one end on the carriage to swing in a horizontal arc, a wheel supporting the opposite end of the bed-frame, means to hold said bed-frame at various angles with relation to the carriage, means carried by the bed-frame to engage opposite sides of and rotate a disk before which the carriage is positioned, and means operating in unison with and adjacent the disk-engaging means to sharpen the edge of said disk as it is rotated by the disk rotating means.

2. Apparatus for sharpening a row of rotatably supported implement disks which includes a track extending parallel to the row of disks, a carriage movable along said track to a position adjacent a disk to be sharpened, a bed-frame pivotally supported at one end on the carriage to swing in a horizontal arc, a wheel supporting the opposite end of the bed-frame, means to hold said bed-frame at various angles with relation to the carriage, means carried by the bed-frame to engage opposite sides of and rotate a disk before which the carriage is positioned, and a grinding wheel operating in unison with and adjacent the disk engaging and rotating means to sharpen the edge of said disk as it is rotated by the disk rotating means.

3. Apparatus for sharpening a row of rotatably supported implement disks which includes a track extending parallel to the row of disks, a carriage movable along said track to a position adjacent a disk to be sharpened, a bed-frame pivotally supported at one end on the carriage to swing in a horizontal arc, a wheel supporting the opposite end of the bed-frame, a sub-frame mounted on the bed-frame to move longitudinally thereof, means carried at the end of the sub-frame adjacent the carriage for engaging and rotating a disk before which the carriage is positioned, disk-sharpening means carried by the sub-frame adjacent the disk-rotating means to sharpen the disk as it is being rotated by the disk-rotating means, and manually controlled means to advance or retract the sub-frame on the bed-frame.

4. Apparatus for sharpening a row of rotatably supported implement disks which includes a track extending parallel to the row of disks, a carriage movable along said track to a position adjacent a disk to be sharpened, a bed-frame pivotally supported at one end on the carriage to swing in a horizontal arc, a wheel supporting the opposite end of the bed-frame, a sub-frame mounted on the bed-frame to move longitudinally thereof, disk-rotating means carried at the end of the sub-frame adjacent the carriage for engaging opposite sides of a disk before which the carriage is positioned, disk-sharpening means carried by the sub-frame adjacent the disk-rotating means to sharpen the disk as it is being rotated by the disk-sharpening means, and manually controlled means to advance or retract the sub-frame on the bed-frame.

5. Apparatus for sharpening a row of rotatably supported implement disks which includes a track extending parallel to the row of disks, a carriage movable along said track to a position adjacent a disk to be sharpened, a bed-frame pivotally supported at one end on the carriage to swing in a horizontal arc, a wheel supporting the opposite end of the bed-frame, a sub-frame mounted on the bed-frame to move longitudinally thereof, manually actuated means to move said sub-frame longitudinally of the bed-frame, a friction wheel carried by the end of the sub-frame adjacent the carriage to engage one side of a disk before which the carriage is positioned, a grinding wheel on the sub-frame for engaging and sharpening the edge of the said disk and means on the sub-frame simultaneously to rotate the friction wheel and the grinding wheel.

6. Apparatus for sharpening a rotatably mounted implement disk which includes a sub-frame, a grinding wheel mounted on the sub-frame adjacent one end thereof to rotate about a horizontal axis and to swing in a vertical arc, disk-rotating means mounted on the sub-frame adjacent the grinding wheel to engage and rotate a rotatably supported implement disk, manually controlled means to move the grinding wheel through the arc into and out of contact with said implement disk, and common drive means to rotate the disk rotating means and the grinding wheel.

7. Apparatus for sharpening a rotatably mounted implement disk which includes a sub-frame, a grinding wheel mounted on the sub-frame adjacent one end thereof to rotate about a horizontal axis and to swing in a vertical arc, a friction drive wheel mounted on the sub-frame adjacent the grinding wheel to engage one side of a rotatably supported implement disk to cause it to rotate, means to move the grinding wheel through said arc into and out of contact with said implement disk and common drive means carried by the sub-frame to rotate the friction drive wheel and the grinding wheel.

8. Apparatus for sharpening a rotatably mounted implement disk which includes a sub-frame, a grinding wheel mounted on the sub-frame adjacent one end thereof to rotate about a horizontal axis and to swing in a vertical arc, a bearing bracket carried by the sub-frame for universal movement adjacent the grinding wheel, a friction wheel mounted for rotation in said bearing bracket to engage and rotate a rotatably supported implement disk, manually controlled means for moving the friction wheel into contact with the implement disk, manually controlled means for moving the grinding wheel through the arc into and out of contact with the implement disk and common drive means mounted on the sub-frame for rotating the friction wheel and the grinding wheel.

9. Apparatus for sharpening a rotatably mounted implement disk which includes a sub-frame, a grinding wheel mounted on the sub-frame adjacent one end thereof to rotate about a horizontal axis and to swing in a vertical arc, a bearing bracket carried by the sub-frame for universal movement adjacent the grinding wheel, a friction wheel mounted in the bearing bracket for rotation about a fixed axis, a cooperating friction wheel mounted in said bearing bracket for movement toward or away from the first-mentioned friction wheel, said friction wheels being adapted to engage opposite sides of a rotatably supported implement disk to cause it to rotate when the friction wheels are rotated, yielding means to hold the friction wheels against opposite sides of said implement disk, means to move the grinding wheel through said arc into and out of contact with the implement disk and common drive means mounted on the sub-frame to rotate the friction wheels and the grinding wheel.

CLARENCE R. HODGES.

REFERENCES CITED

The following references are of record in the file of this patent:

UNITED STATES PATENTS

| Number | Name | Date |
|---|---|---|
| 681,440 | Clizbe | Aug. 27, 1901 |
| 727,981 | Lomasney | May 12, 1903 |
| 1,610,768 | Graham | Dec. 14, 1926 |
| 1,886,859 | Wright | Nov. 8, 1932 |
| 1,961,540 | Williams | June 5, 1934 |
| 2,244,586 | Venable | June 3, 1941 |
| 2,330,510 | Moffat et al. | Sept. 28, 1943 |